United States Patent

Schutze et al.

[11] 3,997,904
[45] Dec. 14, 1976

[54] CAMERA CIRCUIT ARRANGEMENT FOR THE PRE-INDICATION OF EXPOSURE TIME

[75] Inventors: Siegfried Schutze, Dresden; Werner Locke, Radebeul, both of Germany

[73] Assignee: VEB Pentacon Dresden, Germany

[22] Filed: May 16, 1975

[21] Appl. No.: 578,319

[30] Foreign Application Priority Data
May 30, 1974 Germany ............................ 178860

[52] U.S. Cl. .......................... 354/23 R; 354/60 L; 356/226
[51] Int. Cl.² ......................................... G03B 17/18
[58] Field of Search .............. 354/23 R, 48, 50, 51, 354/60 R, 60 E, 60 L; 356/226, 227

[56] References Cited
UNITED STATES PATENTS

| | | | |
|---|---|---|---|
| 3,470,798 | 10/1967 | Miyakawa ........................ | 354/51 X |
| 3,698,298 | 10/1972 | Kikuchi et al. ................... | 354/60 X |
| 3,765,312 | 10/1973 | Takishima ......................... | 354/51 |

FOREIGN PATENTS OR APPLICATIONS 4,730,854   1972   Japan .................................. 354/23

*Primary Examiner*—Joseph F. Peters, Jr.
*Attorney, Agent, or Firm*—William Anthony Drucker

[57] ABSTRACT

A circuit arrangement for the pre-indication of the exposure time to be expected in automatic mirror-reflex cameras in which the brightness of a controllable luminous element, which is constant for the duration of the exposure, is used for the illumination of the photo-receiver of the electronic time-formation system. The voltage dropping over the luminous element, which is proportional to the exposure time, is ascertained by means of a measuring mechanism. The luminous element is formed as luminous diode and in parallel therewith, there is connected a current path containing the measuring mechanism fed from a constant current source for the compensation of the response voltage of the luminous diode and for the adaptation of the measuring mechanism to the characteristics of the luminous diode.

3 Claims, 2 Drawing Figures

CAMERA CIRCUIT ARRANGEMENT FOR THE PRE-INDICATION OF EXPOSURE TIME

BACKGROUND OF THE INVENTION

The invention relates to a circuit arrangement for the pre-indication of the exposure time to be expected in automatic mirror-reflex cameras.

In automatic mirror-reflex cameras it is known to reproduce the subject brightness by means of a controllable incandescent lamp and to use the latter for the illumination of a photo-receiver associated with the time-formation electronic system. A measuring mechanism connected in parallel with the incandescent lamp serves for the pre-indication of the exposure time to be expected, which is formed by the time-formation electronic system.

By reason of the use of an incandescent lamp for the reproduction of the subject brightness, these known devices necessitate a relatively long build-up time of the circuit and an increased loading of the utilised battery.

OBJECT OF THE INVENTION

The object of the invention consists in producing a circuit arrangement for the pre-indication of the exposure time to be expected in automatic mirror-reflex cameras which work with a photo-receiver of the electronic time-formation system illuminated by a luminous element, in which the indication takes place almost without inertia and is independent of fluctuations of the working voltage and of the ambient temperature.

Thus the disadvantages of the known systems are substantially eliminated.

SUMMARY OF THE INVENTION

According to the invention there is provided a circuit arrangement for the pre-indication of the exposure time to be expected in an automatic mirror-reflex camera comprising:
a. an electronic time forming system including a photo-receiver;
b. a controllable luminous diode, the brightness of which is constant for the duration of the exposure and which is used for the illumination of the photo-receiver of said time formation circuit;
c. a measuring mechanism for measuring the voltage dropped across the luminous diode which is proportional to the exposure time;
d. a constant current source;
e. a current path in parallel with the luminous diode fed from said constant current source which contains the measuring mechanism for compensation of the response voltage of the luminous diode and for the adaption of the measuring mechanism to the characteristics of the luminous diode.

The current path preferably consists of a series connection of at least one diode and of an adjustable resistor on the one hand and of a further adjustable resistor with the measuring mechanism on the other.

The constant current source may be formed by a transistor with an emitter resistor, a stable direct current voltage being conducted to the base of the transistor.

With the circuit arrangement according to the invention the use of an ordinary deflection measuring mechanism with linear characteristic is possible and a time pre-indication independent of voltage fluctuations and of variations of the ambient temperature is ensured.

BRIEF DESCRIPTION OF THE DRAWINGS

The invention will be explained hereinafter by way of example with reference to the accompanying drawing in which.

DESCRIPTION OF PREFERRED EMBODIMENTS

Figure 1:
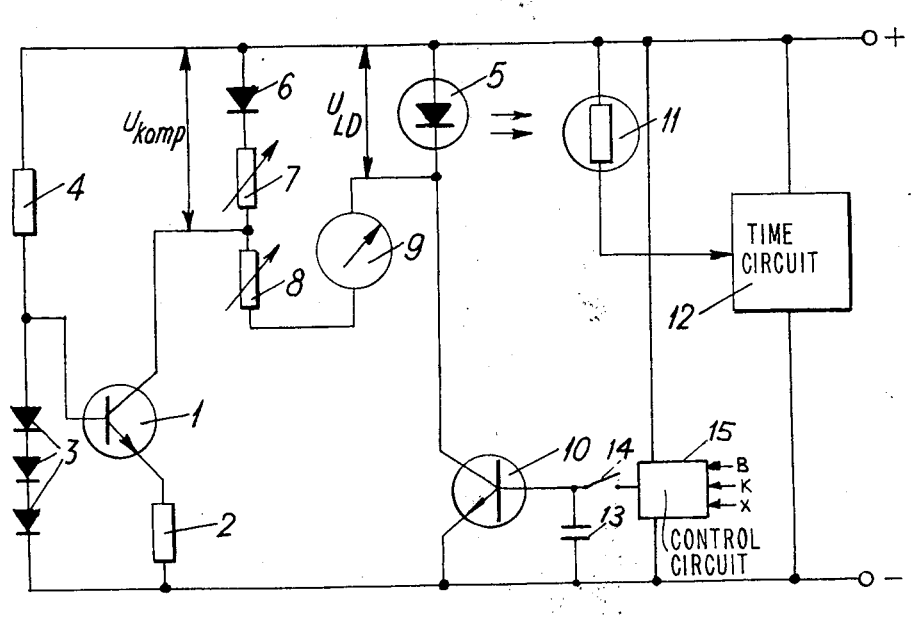
FIG. 1 shows a circuit arrangement according to the invention for the pre-indication of the exposure time.

A constant current source (see FIG. 1) formed from a transistor 1 and an emitter resistor 2 is fed from stabilising diodes 3 and a fixed resistor 4. The collector of the transistor 1 is connected to a current path connected in parallel with a luminous diode 5 and consisting of a series connection of a diode 6 and an adjustable resistor 7 on the one hand and of a further adjustable resistor 8 and a measuring mechanism 9 on the other. The luminous diode 5, in the range of radiation of which a photo-receiver (photo-conductive cell) 11 of a time circuit 12 lies, is connected to the collector of a transistor 10.

The manner of operation is as follows:

The transistor 10 is controlled by the charging of a storage capacitor 13 which is charged from a circuit 15 via a switch 14 which is opened when the camera is operated, and thus the brightness of the luminous diode 5 is regulated, by the output signal of the circuit 15 into which the subject brightness B, the lens diaphragm aperture K and film sensitivity X set in each case are introduced before operating the shutter. During the exposure phase of the camera the brightness of the luminous diode 5 is kept constant by means of the storage capacitor 13 and the diode 5 serves for the illumination of the photo-receiver 11, arranged in the interior of the camera, of the time circuit 12 which controls the shutter.

The brightness of the luminous diode 5 is determined by the collector current of the transistor 10 and thus the voltage $U_{LD}$ dropped across the luminous diode 5 is proportional to the exposure time to be expected, thus allowing the exposure time to be pre-indicated by means of the measuring mechanism 9.

Figure 2:
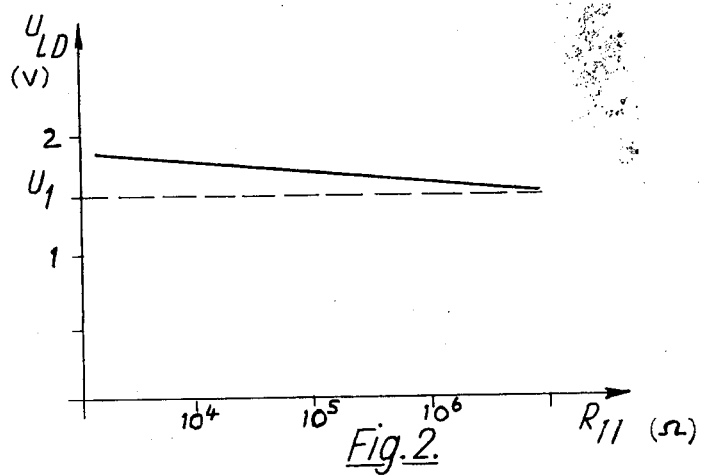
FIG. 2 shows a graph of $R_{11} = f(U_{LD})$ where $R_{11}$ is the resistance value of the photocell and $U_{LD}$ is the voltage across the luminous diode of the circuit of FIG. 1.

It can be seen from FIG. 2 that luminous diodes require a relatively high response voltage $U_1$ before they being to illuminate. On increase of the brightness of the luminous diode 5 which causes a fall in resistance of photoconductive cell 11, only a relatively flat increase takes place in the voltage $U_{LD}$ over the luminous diode. In order that despite this behaviour a linear measuring mechanism 9 may be used for the time pre-indication, according to the invention the response voltage of the luminous diode 5 is compensated by the voltage $U_{KOMP}$ which occurs due to the constant current flowing over the adjustable resistor 7 and the diode 6 from the transistor 1. The adjustable resistor 8 serves for the adaptation of the sensitivity of the measuring mechanism to the voltage rise of the luminous diode in the required working range. It is possible through the two adjustable resistors 7, 8 to compensate differences in the characteristics of the luminous diode 5 and of the measuring mechanism 9 within wide limits. The value of $U_{KOMP}$ thus corresponds to the response voltage $U_1$ in magnitude but in the opposite sense. Time-consuming group assortments of diodes and measuring mechanisms in the assembly of the camera are thus eliminated.

It is within the scope of the invention if the transistor 1 is fed from a stable direct current voltage obtained elsewhere, in place of the stabilising diodes 3.

We claim:

1. A circuit arrangement for the pre-indication of the exposure time to be expected in an automatic mirror-reflex camera and comprising:
   a. an electronic time forming system including a photo-receiver;
   b. a controllable luminous diode, the brightness of which is dependent on the expected exposure and which brightness is held constant for the duration of the exposure to illuminate the photo-receiver of said time formation circuit;
   c. a measuring mechanism for measuring a voltage dropped across the luminous diode which voltage drop includes a portion dependent on the response voltage of said luminous diode;
   d. a constant current source;
   e. compensation means receiving the current from said constant current source and connected between said luminous diode and said measuring mechanism to provide compensation for the response voltage of said luminous diode whereby said measuring mechanism measures a voltage substantially linearly dependent on the expected exposure time.

2. A circuit arrangement according to claim 1, wherein said compensation means comprises at least one diode and an adjustable resistor connected in series and wherein a further adjustable resistor is provided in series with the measuring mechanism.

3. A circuit arrangement according to claim 1, wherein the constant current source is formed by a transistor with an emitter resistor and a stable direct-current voltage being conducted to the base of the transistor.

* * * * *